United States Patent
Van Slyke

(10) Patent No.: US 6,595,501 B2
(45) Date of Patent: Jul. 22, 2003

(54) CONE AND BALL BEARING VIBRATION DAMPER

(76) Inventor: Paul B. Van Slyke, 12815 Porcupine La., Colorado Springs, CO (US) 80908

(*) Notice: Subject to any disclaimer, the term of this patent is extended or adjusted under 35 U.S.C. 154(b) by 0 days.

(21) Appl. No.: 10/020,751

(22) Filed: Dec. 11, 2001

(65) Prior Publication Data

US 2003/0107162 A1 Jun. 12, 2003

(51) Int. Cl.[7] .................................................. F16M 9/00
(52) U.S. Cl. ...................... 267/136; 267/140.3; 384/470
(58) Field of Search ................................. 267/136, 166, 267/195, 182, 141, 140.3, 140.4; 188/378, 379, 380; 384/545, 470, 43, 44, 276

(56) References Cited

U.S. PATENT DOCUMENTS 4,108,424 A * 8/1978 Rizzo .......................... 267/166
5,383,729 A * 1/1995 Hsieh .......................... 384/545

FOREIGN PATENT DOCUMENTS

| JP | 411257423 | * | 9/1999 |
| JP | 2001074093 | * | 3/2001 |
| RU | 2009382 | * | 3/1994 |

* cited by examiner

*Primary Examiner*—Christopher P. Schwartz
*Assistant Examiner*—Melanie Torres
(74) *Attorney, Agent, or Firm*—G. F. Gallinger

(57) ABSTRACT

A damper for isolation of vibration includes: three ball bearings; a bearing support member having a sloping top side portion adapted to gently maintain the three ball bearings in spaced position when rollingly carried thereon; and, an equipment support member having a sloping bottom side portion seated on, and carried by a top side portion of the three ball bearings. When vibration moves the roller support member, the ball bearings roll and the equipment support member carried thereon remains relatively stable. The damper may be carried on a suspended carriage having: an upright tube having an open top portion and three spaced openings therearound; bolts positioned above the spaced openings; an inner suspended member having three outwardly projecting legs positioned to project through the openings in the upright tube; and, three bands each interconnecting the bolts and the projecting legs thereby suspending the carriage within the tube.

18 Claims, 1 Drawing Sheet

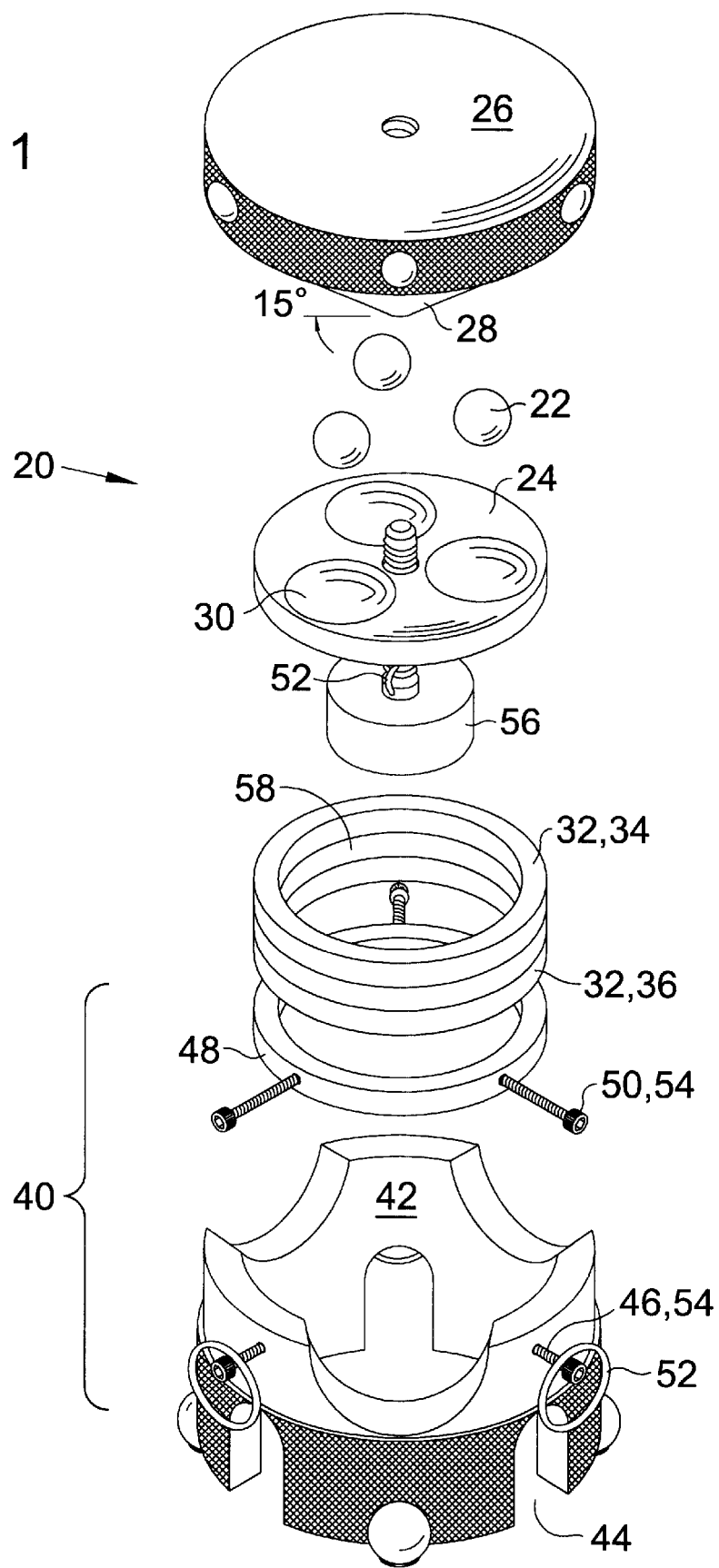

CONE AND BALL BEARING VIBRATION DAMPER

FIELD OF INVENTION

This invention relates to dampers used to isolate sensitive equipment from vibration. More particularly this invention relates to a damper utilizing a cone and ball bearings having particular applicability in isolating audio and video equipment from ambient vibrations.

BACKGROUND OF THE INVENTION

High end audio and video systems are most susceptible to distortion arising from vibration transmission. Mechanical vibration remains a substantial source of distortion in music and video playback and recording equipment such as turntables, compact disk (CD"s); digital video disks (DVD"s) and generally any equipment that has motors and/or rotating mechanisms. A long standing need exists for a better vibration damper.

OBJECTS AND STATEMENT OF INVENTION

It is an object of this invention to disclose a dramatically improved mechanical vibration damper. It is an object of this invention to disclose an inherently self centering and automatically leveling vibration damper which produces here before unavailable distortion free reproduction in audio and video equipment employing motors and/or rotating mechanisms. It is yet a further object of this invention to disclose a compact and efficient design for a suspended vibration absorbing platform. It is a final object of this invention to disclose a combination of a conical multi-ball bearing damper carried by a suspended vibration absorbing platform which is attractive and compact in appearance. This combination has been tested and has been shown to be substantially the best audio and video mechanical vibration damping available.

One aspect of this invention provides for a damper for isolation of vibration. The damper comprises: three ball bearings; a bearing support member having a sloping top side portion adapted to gently maintain the three ball bearings in spaced position when rollingly carried thereon; and, an equipment support member having a sloping bottom side portion seated on, and carried by a top side portion of the three ball bearings. When vibration moves the roller support member, the ball bearings roll and the equipment support member carried thereon remains relatively stable.

Another aspect of this invention provides for a suspended carriage for vibration isolation comprising: an upright tube having an open top portion and three spaced openings therearound; band suspension means positioned above the spaced openings; an inner suspended member having three outwardly projecting legs positioned to project through the openings in the upright tube; and, three bands each interconnecting the band suspension means and the projecting legs thereby suspending the carriage within the tube.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawings and description, in which preferred embodiments of the invention are illustrated.

FIGURES OF THE INVENTION

The invention will be better understood and objects other than those set forth will become apparent to those skilled in the art.when consideration is given to the following detailed description thereof. Such description makes reference to the annexed drawings wherein:

FIG. 1 is an exploded perspective view of a cone and vibration ball bearing damper carried on a suspended carriage.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a damper 20 for isolation of vibration. The damper 20 comprises: three ball bearings 22; a bearing support member 24 having a sloping top side portion adapted to gently maintain the three ball bearings 22 in spaced position when rollingly carried thereon; and an equipment support member 26 having a sloping bottom side portion 20 seated on, and carried by a top side portion of the three ball bearings 22. When vibration moves the roller support member 24, the ball bearings roll and the equipment support member 26, carried thereon, remains relatively stable. Lateral vibration not only must move the inertial mass of the equipment support member 26, carried on the ball bearings 22, but additionally, in order to laterally move the equipment support member 26 must be marginally lifted.

Most preferably, the bearing support member 24 and the equipment support member 26 are generally circular. The top side portion of the bearing support member 24 is sloped to maintain the bearings 22 in spaced concentric alignment thereon. In the most preferred embodiment of the invention the bearings 22 are seated in rounded indentations 30 on the bearing support member 24 so that they are maintained in spaced relationship as well as proper radial position.

Most preferably the sloping bottom side portion of the equipment support member 26 comprises a cone 28. Most preferably the cone is truncated and an angle between a curved side of the cone 28 and a base of the cone 28 is less than 30 degrees. In a most preferred embodiment of the invention the angle between a curved side of the cone and the base of the cone is generally 15 degrees. The ball bearings 22 are generally one half inches in diameter and the bearing support member 24 and equipment support member 26 are three inches in diameter. Because the point of contacts between the cone 28 and the ball bearings 22 are so minute in area, and efficient lateral movement must be facilitated, hardened chrome or tungsten steel balls 22, having a grade of 3 to 25 (or a shericity of within 3 to 25 millionths of an inch), and a solid gray iron cone 28 are employed. Gray iron (ASTM #50) has a Brinell hardness of 260. The applicant believes that use of a gray iron cone 28, as opposed to the generally available brass cones (not shown) having a Brinell hardness of 60 results in a consistently undeformed cone 28 which will facilitate efficient rolling.

The bearing support member 24 further comprises lower layers of vibration absorbent material 32. The vibration absorbent material most preferably comprises a layer of felt 34, and a layer of cork 36.

Most preferably, the bearing support member 24 is carried on a suspended carriage 40. The suspended carriage 40 comprises: an upright tube 42 having an open top portion and three spaced openings 44 therearound; band suspension means 46 positioned above the spaced openings 44; an inner suspended member 48 having three outwardly projecting legs 50 positioned to project through the openings 44 in the upright tube 42; and, three bands 52 each interconnecting the band suspension means 46 and the projecting legs 50 thereby suspending the inner suspended member 48 within the tube 42.

In the most preferred embodiment of the invention, the tube 42 and inner suspended member 48 are round. The openings 44 through the tube 42 extend fully from a lower end portion of the tube 42, which is open, so that the inner suspended member 48 may be inserted within the tube 42 through the lower end portion thereof, without removal of the legs 50. The bands 52 are rubber O-rings which are neoprene. The band suspension means 46 and legs 50 comprise bolts 54.

In a preferred embodiment of the invention, a hanging or decoupled inertial mass 56 is additionally included. The decoupled inertial mass 56 is decoupled from the bearing support member 24 with a rubber band 52, or with a silicone decoupling medium (not shown). The lower layers of the bearing support member 24 and the inner suspended member 48 have a central inner opening 58 to accomodate the decoupled inertial mass 56.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A damper for isolation of horizontal vibration comprising:
    three ball bearings;
    a bearing support member having a sloping top side portion adapted to gently maintain the three ball bearings in spaced position when rollingly carried thereon;
    an equipment support member having a sloping bottom side portion seated on, and carried by a top side portion of the three ball bearings;
    so that when horizontal vibration moves the bearing support member, the ball bearings roll both on the top side portion and on the bearing support member, whereby the top side portion and the bearing support member concurrently move both vertically apart, and horizontally with respect to each other, so that horizontal vibration transmitted from the bearing support member to the equipment support member is minimized.

2. A damper as in claim 1 wherein the bearing support member and the equipment support member are generally circular and wherein a top side portion of the bearing support member is sloped to maintain the bearings in spaced concentric alignment thereon.

3. A damper as in claim 2 wherein the sloping bottom side portion of the equipment support member comprises a cone.

4. A damper as in claim 3 wherein the cone is truncated and the angle between a curved side of the cone and a base of the cone is generally less than 45 degrees.

5. A damper as in claim 4 wherein the angle between a curved side of the cone and the base of the cone is generally 15 degrees.

6. A damper as in claim 3 wherein the bearings are seated in rounded indentations on the bearing support member so that they are maintained in spaced relationship as well as proper radial position.

7. A damper as in claim 4 wherein the equipment support member comprises hard grey iron.

8. A as in claim 5 wherein the ball bearings are generally one half inches in diameter and the bearing support member and equipment support member are generally three inches in diameter.

9. A damper as in claim 6 wherein the bearing support member further comprises lower layers of vibration absorbent material.

10. A damper as in claim 6 wherein the vibration absorbent material comprises cork and felt.

11. A damper as in claim 6 wherein the bearing support member is carried on a suspended carriage comprising:
    an upright tube having an open top portion and three spaced openings therearound;
    band suspension means positioned above the spaced openings;
    an inner suspended member having three outwardly projecting legs positioned to project through the openings in the upright tube; and,
    three bands each interconnecting one of the band suspension means and a corresponding projecting leg, thereby suspending the carriage within the tube.

12. A damper as in claim 11 wherein the tube and inner suspended member are round and wherein the openings therethrough extend from a lower end portion of the tube which is open so that the inner suspended member may be inserted within the tube through the lower end portion thereof without removal of the legs.

13. A damper as in claim 11 wherein the bands comprise rubber O-rings and wherein the band suspension means and legs comprise bolts.

14. A carriage as in claim 9 further comprising a hanging inertial mass, and wherein the inner suspended member and lower layers of the bearing support member carried on the inner suspended member have a central inner opening to accommodate the decoupled inertial mass.

15. A suspended carriage for vibration isolation comprising:
    an upright tube having an open top portion and three spaced openings therearound;
    band suspension means positioned above the spaced openings;
    an inner suspended member having three outwardly projecting legs positioned to project through the openings in the upright tube; and,
    three bands each interconnecting the band suspension means and the projecting legs thereby suspending the carriage within the tube.

16. A carriage as in claim 15 wherein the tube and inner suspended member are round and wherein the openings therethrough extend from a lower end portion of the tube which is open so that the inner suspended member may be inserted within the tube through the lower end portion thereof without removal of the legs.

17. A carriage as in claim 16 wherein the bands comprise rubber O-rings and wherein the band suspension means and legs comprise bolts.

18. A carriage as in claim 17 wherein the O-rings are neoprene.

* * * * *